US012266887B2

(12) United States Patent
Akiguchi

(10) Patent No.: US 12,266,887 B2
(45) Date of Patent: Apr. 1, 2025

(54) WATERPROOF CONNECTOR AND SEALING ELEMENT

(71) Applicant: Tyco Electronics Japan G.K., Kawasaki (JP)

(72) Inventor: Tetsuro Akiguchi, Kakegawa (JP)

(73) Assignee: Tyco Electronics Japan G.K., Kawasaki (JP)

( * ) Notice: Subject to any disclaimer, the term of this patent is extended or adjusted under 35 U.S.C. 154(b) by 323 days.

(21) Appl. No.: 17/748,158

(22) Filed: May 19, 2022

(65) Prior Publication Data

US 2022/0376432 A1 Nov. 24, 2022

(30) Foreign Application Priority Data

May 19, 2021 (JP) ................................ 2021-084918

(51) Int. Cl.
*H01R 13/52* (2006.01)
*H01R 13/502* (2006.01)

(52) U.S. Cl.
CPC ....... *H01R 13/5221* (2013.01); *H01R 13/502* (2013.01); *H01R 13/5202* (2013.01)

(58) Field of Classification Search
CPC .............. H01R 13/5221; H01R 13/502; H01R 13/5202
See application file for complete search history.

(56) References Cited

U.S. PATENT DOCUMENTS 5,197,898 A 3/1993 Nagamine
6,371,807 B1 4/2002 Takagishi et al.
7,244,133 B2 7/2007 Muller et al.
(Continued)

FOREIGN PATENT DOCUMENTS

EP 0920084 A2 6/1999
JP H05326066 A 12/1993
(Continued)

OTHER PUBLICATIONS

Extended European Search Report, Application No. 22174020.2-1201, dated: Oct. 17, 2022, 9 pages.
(Continued)

*Primary Examiner* — Vanessa Girardi
(74) *Attorney, Agent, or Firm* — Barley Snyder

(57) ABSTRACT

The sealing element of the waterproof connector has a shape in which a family seal portion that waterproofs the peripheries of electric wires which are sandwiched between an inner housing and an outer housing 40, and which are not illustrated, and a seal ring portion that performs waterproofing between the seal ring portion and a mating housing are integrated. The standing board portions of the inner housing penetrate the long openings of the sealing element, and the portion to be caught of the outer housing is caught by catch protrusion portions that are formed in upper portions of the standing board portions and each have a hook shape, whereby the inner housing and the outer housing are assembled in a state in which the family seal portion of the sealing element is sandwiched between the inner housing and the outer housing. The mating housing comes into contact with the third waterproof portion of the sealing element, which acts as the seal ring portion.

18 Claims, 10 Drawing Sheets

(56) References Cited

U.S. PATENT DOCUMENTS

| | | | | |
|---|---|---|---|---|
| 9,318,841 | B2 * | 4/2016 | Gimbel | H01R 13/506 |
| 2006/0040553 | A1 | 2/2006 | Yamashita | |
| 2008/0280497 | A1 | 11/2008 | Casses et al. | |

FOREIGN PATENT DOCUMENTS

| | | | |
|---|---|---|---|
| JP | H11260456 | A | 9/1999 |
| JP | 2000021491 | A | 1/2000 |
| JP | 2002075523 | A | 3/2002 |
| JP | 200766898 | A | 3/2007 |
| JP | 2010153072 | A | 7/2010 |
| JP | 2014520376 | A | 8/2014 |
| JP | 2015028894 | A | 2/2015 |
| WO | 2010095697 | A1 | 8/2010 |
| WO | 2013174979 | A1 | 11/2013 |

OTHER PUBLICATIONS

Japanese Inquiry of History Information dated Dec. 4, 2024 with English translation, corresponding to Application No. 2021-084918, 7 pages.

* cited by examiner

WATERPROOF CONNECTOR AND SEALING ELEMENT

CROSS-REFERENCE TO RELATED APPLICATIONS

This application claims the benefit of the filing date under 35 U.S.C. § 119(a)-(d) of Japanese Patent Application No. 2021-084918, filed May 19, 2021.

FIELD OF THE INVENTION

The invention relates to a sealing element for an electrical connector and a waterproof connector using the sealing element.

BACKGROUND

Connectors with water-proof performance have been widely used. In such a waterproof connector, a sealing element facilitates the waterproofing.

A waterproof connector in which a plurality of electric wires are connected includes, as moisture intrusion paths, an intrusion path along each of the electric wires, and an intrusion path from a gap between a connector housing and the housing of a mating connector. It is necessary to break both the intrusion paths. Therefore, this type of the waterproof connector utilizes a first sealing element that is referred to as a family seal and surrounds each electric wire to break the intrusion path along each electric wire, and a second sealing element that is referred to as a seal ring and is positioned to surround the periphery of the connector housing to break the path of intrusion of moisture from the gap between the housings. In this case, the two sealing elements which are the family seal and the seal ring are required.

Under such circumstances as described above, what is needed is a waterproof connector with a reduced cost and a sealing element that imparts a waterproofing property to the connector.

SUMMARY

A waterproof connector includes a connector housing that mates with a mating housing and a sealing element that is a continuous integral component. The sealing element has a family seal portion that surrounds a periphery of each of a plurality of electric wires to perform waterproofing between the electric wires and a seal ring portion that is positioned between the mating housing and the connector housing to perform sealing between the mating housing and the connector housing in a case of mating with the mating housing.

BRIEF DESCRIPTION OF DRAWINGS

The invention will now be described by way of example with reference to the accompanying figures of which.

DETAILED DESCRIPTION OF THE EMBODIMENT(S)

Figure 1:
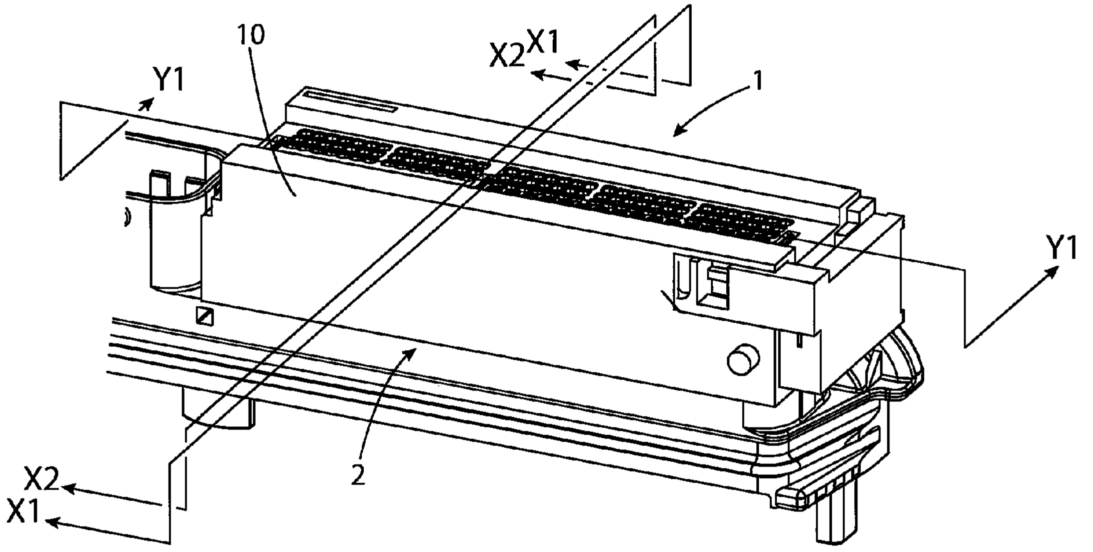
FIG. 1 is an isometric view of a waterproof connector according to one embodiment of the invention.

FIG. 1 is an isometric view of a waterproof connector according to one embodiment of the invention. This FIG. 1 illustrates the waterproof connector 1 in mated with a mating connector 2.

A sealing element according to one embodiment of the invention is mounted in the waterproof connector 1. The sealing element will be described later.

The connector housing 10 of the waterproof connector 1 includes an inner housing and an outer housing. The structure of the connector housing 10 will also be described later.

Figure 2:
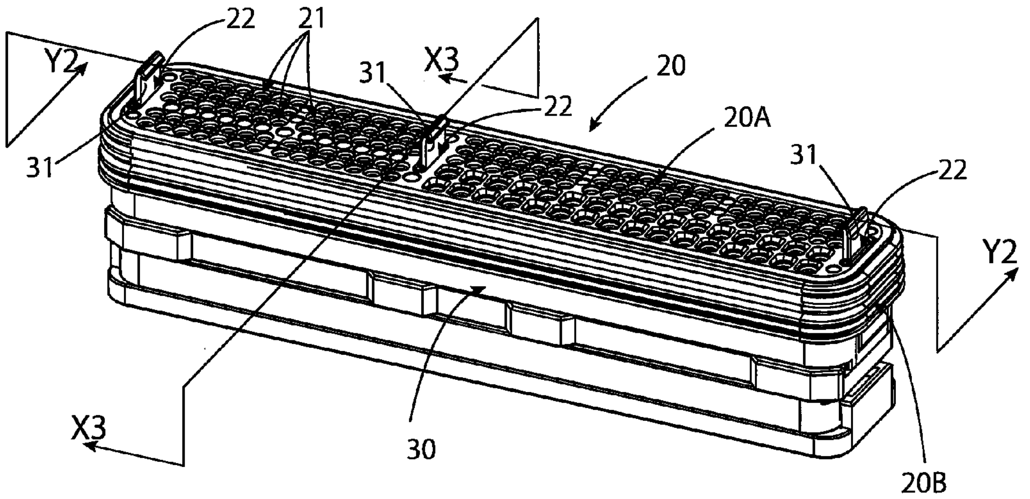
FIG. 2 is an isometric view illustrating an inner housing and a sealing element in the state of being assembled.

FIG. 2 is an isometric view illustrating the inner housing and the sealing element in an assembled state. In other words, this FIG. 2 illustrates the inner housing and the sealing element, included in the interior of the waterproof connector with the outer housing being removed.

The sealing element 20 is positioned on the inner housing 30 so as to cover the upper portion of the inner housing 30 and the upper portions of the sides of the inner housing 30. The inner housing 30 shown is an example of a first housing according to the invention.

The sealing element 20 includes a family seal portion 20A in which a large number of electric wire insertion openings 21 penetrate the sealing element in a mating direction, i.e., in an upward-downward direction in this FIG. 2. One electric wire, which is not illustrated, is inserted into each of the electric wire insertion openings 21 through the family seal portion 20A.

In the sealing element 20, long openings 22 extending in a crosswise direction are open in three places including both the longitudinal ends of the sealing element 20. Standing board portions 31 included in the inner housing 30 are inserted from below the long openings 22 into the long openings 22, and pass to an area above the sealing element 20. The long openings 22 are an example of a through-hole according to the invention, and the standing board portions 31 are examples of a penetration catch portion according to the invention. The long openings 22 and the standing board portions 31 will be described later.

The sealing element 20 is formed of an elastic member such as rubber. As illustrated in the cross section of FIG. 3B, a concave portion 201 that is opened downward is formed in the lower part of the sealing element 20. The sealing element

20 is positioned so as to be put on the inner housing 30, so that the inner housing 30 fits into the concave portion 201.

Figure 3:
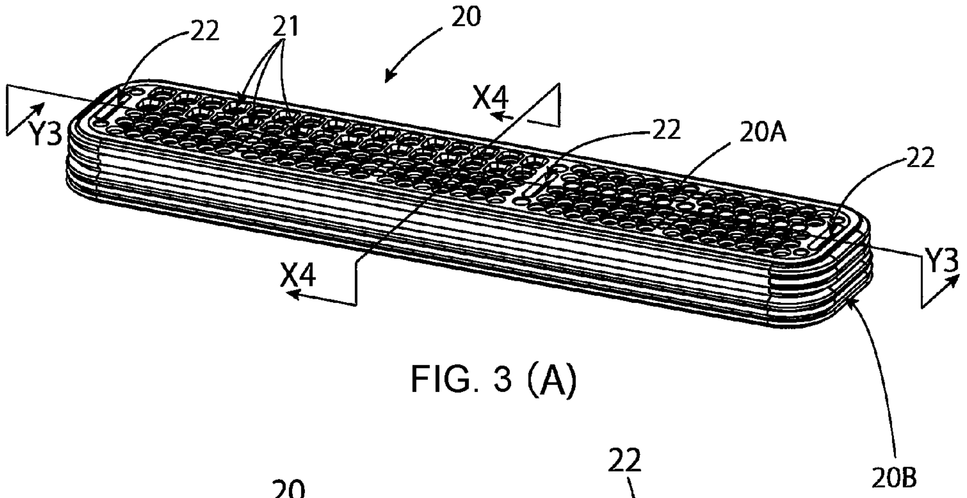
FIG. 3A is an isometric view of the sealing element.
FIG. 3B is cross-sectional perspective view of the sealing element taken along the line X4-X4 of FIG. 3A.
Figure 3:
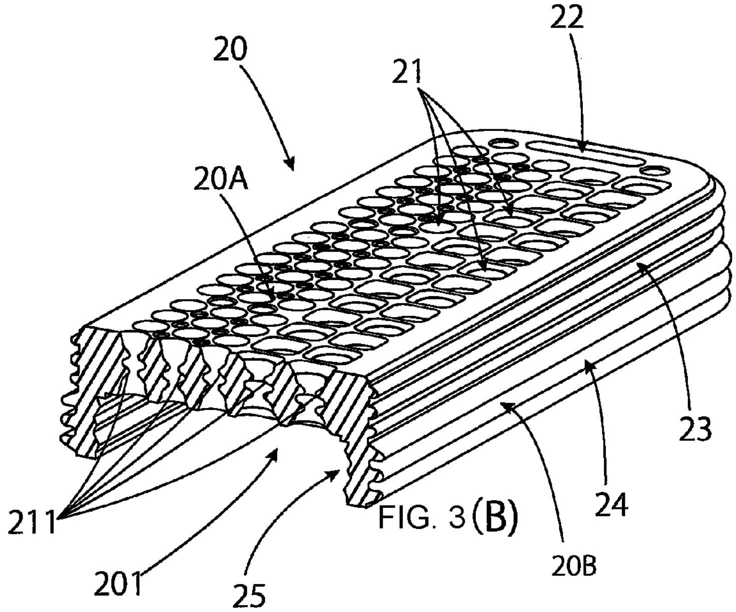

As illustrated in the cross section of FIG. 3B, first waterproof portions 211 each having a wave shape with successive recesses and projections extending in an upward-downward direction are formed on the inner wall surfaces of the electric wire insertion openings 21. The recesses and projections surround the electric wires inserted into the electric wire insertion openings 21, to seal the peripheries of the electric wires.

Moreover, the sealing element 20 includes a second waterproof portion 23 in the upper half of the outer peripheral surface of the sealing element 20. The second waterproof portion has a wave shape with successive recesses and projections extending in an upward-downward direction. The recesses and the projections forming the wave shape extend around the sealing element 20. The second waterproof portion 23 performs sealing between the second waterproof portion 23 and the outer housing described later.

In addition, the sealing element 20 includes a third waterproof portion 24 in the lower half of the outer peripheral surface of the sealing element 20. Like the second waterproof portion 23, the third waterproof portion 24 also has a wave shape with successive recesses and projections extending in an upward-downward direction. The recesses and the projections forming the wave shape extend around the sealing element 20. The third waterproof portion 24 is a seal ring portion 20B that performs sealing between the seal ring portion 20B and a mating housing (described later) included in the mating connector 2 (see FIG. 1). The seal ring portion 20B corresponds to an example of a seal ring portion according to the invention.

In addition, the sealing element 20 includes a fourth waterproof portion 25 on the wall surface of the concave portion 201. Like the second waterproof portion 23 and the third waterproof portion 24, the fourth waterproof portion 25 also has a wave shape with successive recesses and projections extending in an upward-downward direction. The recesses and the projections forming the wave shape extend around the inner wall surface of concave portion 201. The fourth waterproof portion 25 performs sealing between the sealing element 20 and the outer wall surface of the inner housing 30 fitting into the concave portion 201.

Figure 4:
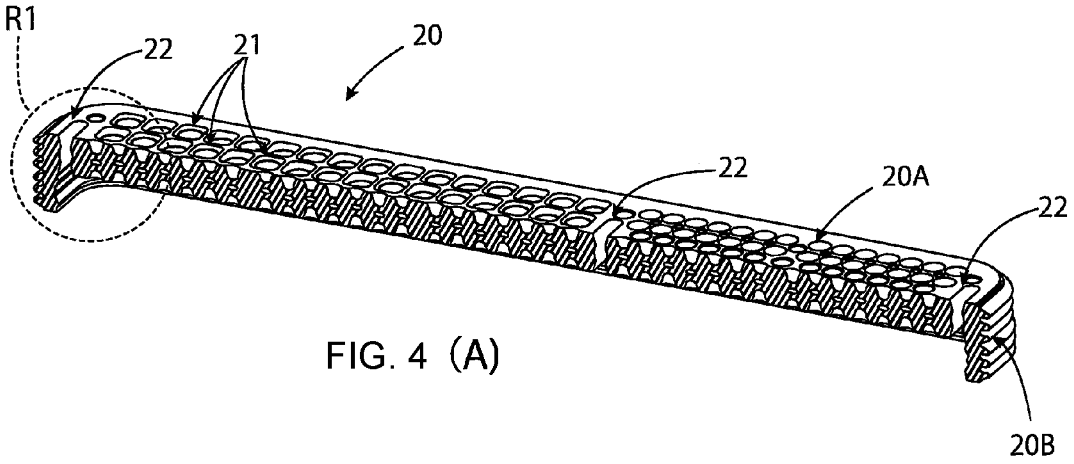
FIG. 4A is a cross sectional perspective view of the sealing element, taken along the line Y3-Y3 of FIG. 3A.
FIG. 4B is an enlarged view of a circle R1 illustrated in FIG. 4A.
Figure 4:
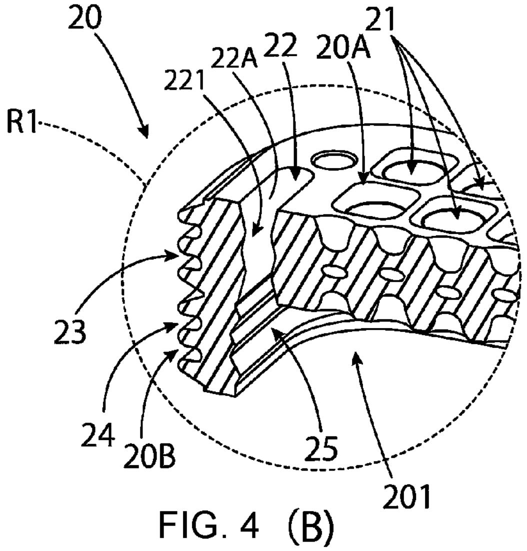

As illustrated in the enlarged view of FIG. 4 B, a fifth waterproof portion 221 has a shape with successive recesses and projections extending in an upward-downward direction. The recesses and the projections horizontally extend around the inner wall surfaces 22, and are formed on the inner wall surfaces 22A of the long openings 22 opened in the three places in the longitudinal direction of the sealing element 20. When the standing board portions 31 are inserted into the long openings 22, the portions having the projection shapes, of the recesses and the projections formed on the inner wall surfaces 22A of the long openings 22, are compressed by the standing board portions 31, to come into intimate contact with the standing board portions 31, whereby a waterproofing or sealing is accomplished.

The recesses and the projections formed in the upward-downward direction on the inner wall surfaces 22A of the long openings 22 are not necessarily identical recesses and projections that are repeated. A certain shape with a recess and a projection and shapes with recesses and projections lining above and below the recess and the projection may differ from each other. The recesses and the projections in the upward-downward direction may be recesses and projections in a wave shape, may be recesses and projections including angular grooves and angular salients, or may be jagged recesses and projections in a triangular shape. Variations in the shape of the recesses and the projections included in this waterproof structure are not limited to the fifth waterproof portions 221 described herein, but are also common to the first waterproof portions 211, the second waterproof portion 23, the third waterproof portion 24, and the fourth waterproof portion 25.

Figure 5:
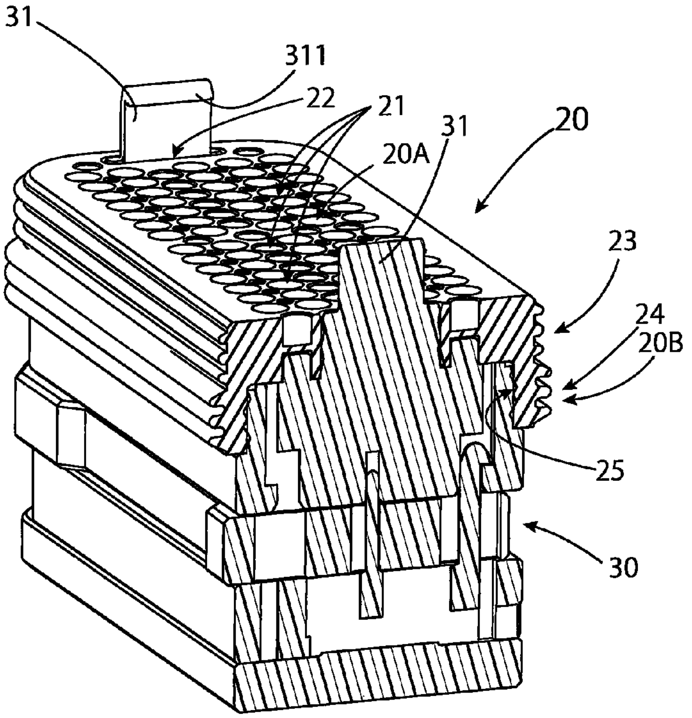
FIG. 5 is a cross sectional perspective view of the sealing element and the inner housing, taken along the line X3-X3 of FIG. 2.

FIG. 5 illustrates a cross section of the sealing element 20 and the inner housing 30. The inner housing 30 includes a plurality of elements. However, the structure itself of the inner housing 30 is all pertinent to the present embodiment, so a description of the inner housing 30 is omitted except for a description of a part associated with the salient features of the present embodiment.

Figure 6:
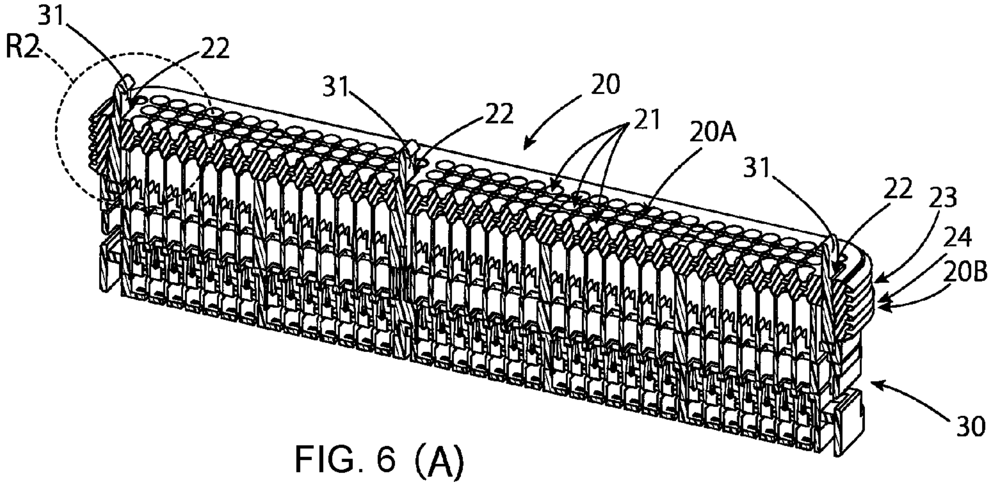
FIG. 6A is a cross sectional perspective view of the sealing element and the inner housing taken along the line Y2-Y2 of FIG. 2.
FIG. 6B is an enlarged view of a circle R2 of FIG. 6A.
Figure 6:
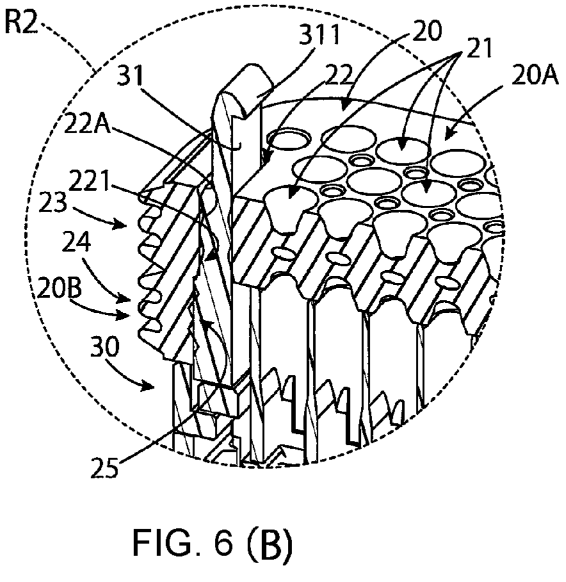

The inner housing 30 is assembled with the sealing element 20 so as to be fitted into the concave portion 201 of the sealing element 20 (see FIG. 3B). When the inner housing 30 is fitted into the concave portion 201 of the sealing element 20, the outer wall surface of the inner housing 30 comes into contact with the fourth waterproof portion 25 of the sealing element 20 to result in blocking of a water intrusion path along the outer wall surface of the inner housing 30, as illustrated in FIG. 6B.

Assembly of the inner housing 30 with the sealing element 20 results in a state in which the standing board portions 31 of the inner housing 30 are inserted into the long openings 22 of the sealing element 20, and the upper portions of the standing board portions 31 protrude upward. The fifth waterproof portions 221 are formed in the long openings 22 of the sealing element 20, and the fifth waterproof portions 221 come into contact with the standing board portions 31 inserted into the long openings 22, to result in blocking of water intrusion paths along the standing board portions 31, as illustrated in FIG. 6B.

Catch protrusion portions 311 each having a hook shape are formed in the upper ends of the standing board portions 31. The catch protrusion portions 311 catch the outer housing. The outer housing will be further described later.

Figure 7:
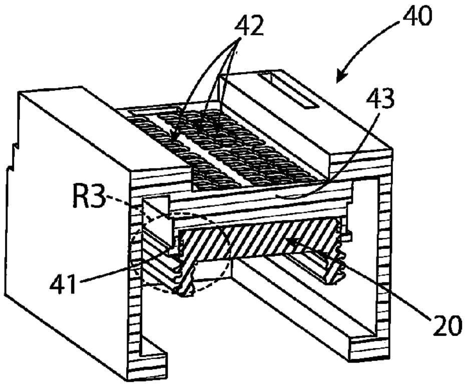
FIG. 7A is a cross sectional perspective view of the waterproof connector, taken along the line X1-X1 of FIG. 1.
FIG. 7B is an enlarged view of a circle R3 illustrated in FIG. 7A.
Figure 7B:
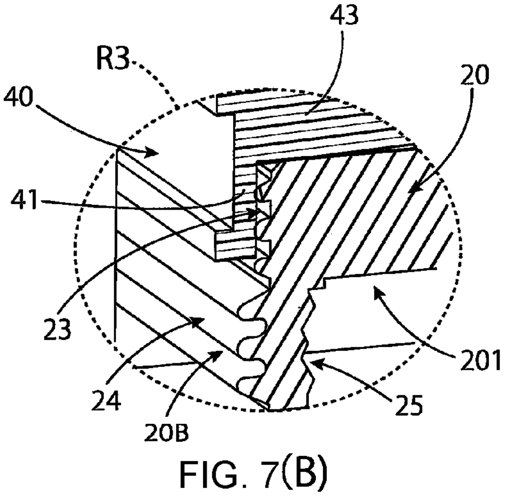

FIG. 7A is a cross sectional view, taken along the line X1-X1, of the waterproof connector illustrated in FIG. 1, and an enlarged view of a circle R3 illustrated in FIG. 7A. The inner housing 30 is not illustrated, but only the sealing element 20 and the outer housing 40 are illustrated. The outer housing 40 corresponds to an example of a second housing according to the invention.

A wall 41 coming into contact with the periphery of the second waterproof portion 23 (see FIG. 3B) formed on the outer peripheral surface of the sealing element 20 is formed on the outer housing 40. In other words, the sealing element 20 is assembled to be fitted in the wall 41 formed on the periphery of the outer housing 40.

Moreover, a plurality of electric wire via openings 42 communicating with the respective electric wire insertion openings 21 of the seal portion 20 are opened in the outer housing 40.

Moreover, these FIGS. 7A & B illustrate the wall 43 to be secured. The wall 43 is secured by the catch protrusion portions 311 (see FIG. 6B) in the leading ends of the standing board portions 31 of the inner housing 30, as illustrated in FIG. 10 described later.

Figure 8:
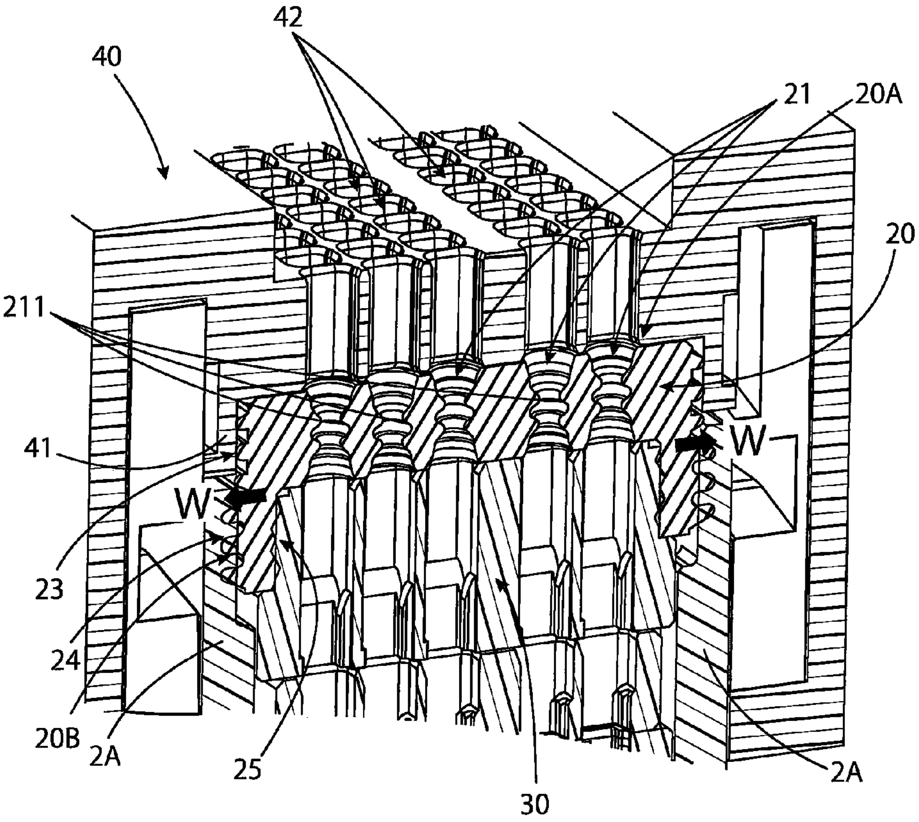
FIG. 8 is an enlarged cross-sectional perspective view of the waterproof connector taken along the line X2-X2 of FIG. 1.
Figure 9:
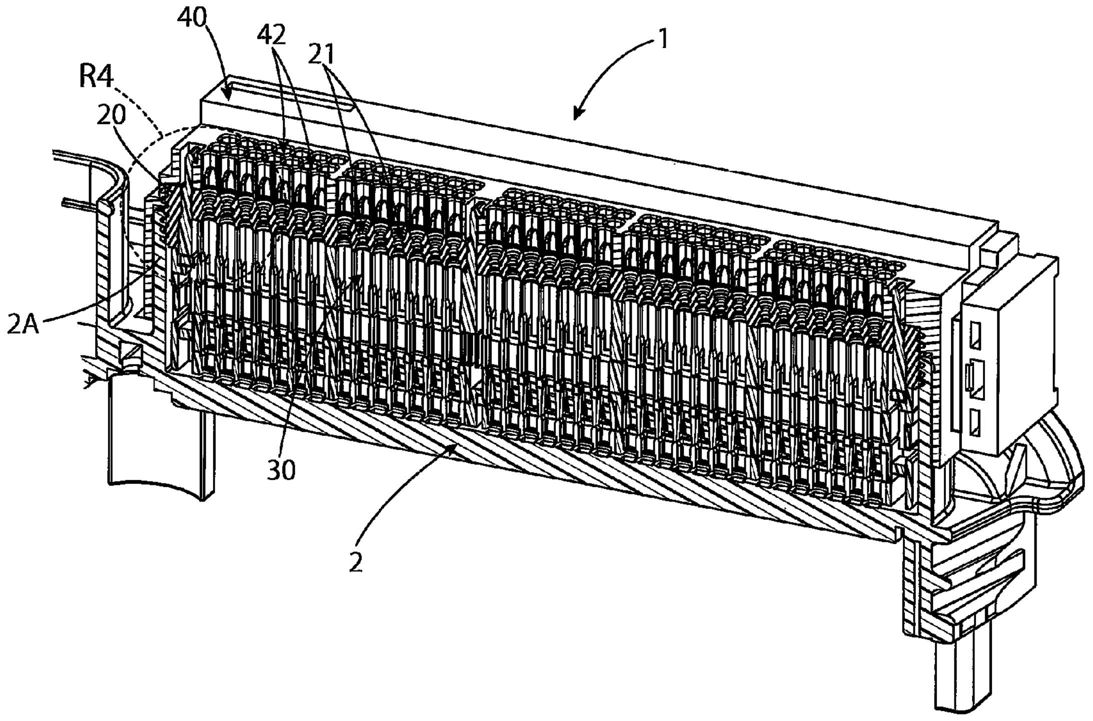
FIG. 9 is a cross sectional perspective view of the waterproof connector, taken along the line Y3-Y3 of FIG. 1.
Figure 10:
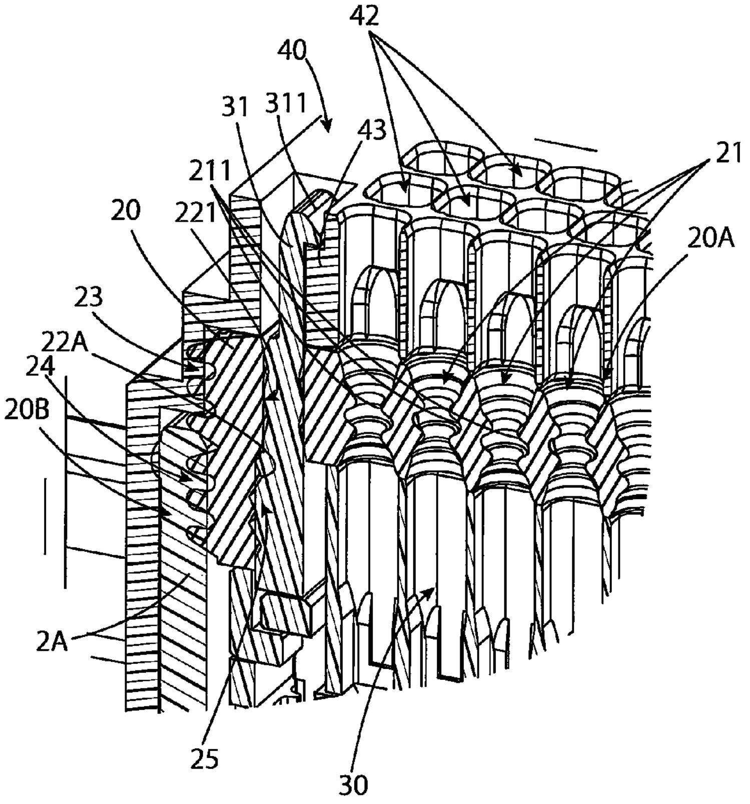
FIG. 10 is an enlarged view of the circle R4, illustrated in FIG. 9.

FIGS. 8 to 10 illustrate not only the sealing element 20 and the outer housing 40 but also the inner housing 30, and, in addition, the portions, playing a role in mating with the waterproof connector 1, of the mating housing 2A included in the mating connector 2.

As illustrated in FIG. 10, the wall 43 of the outer housing 40 is secured by the catch protrusion portions 311 formed in the leading ends, passing through the long openings 22 of the sealing element 20, of the standing board portions 31 of the inner housing 30. As a result, the sealing element 20 is positioned in a state in which the portions, in which the electric wire insertion openings 21 are formed, of the sealing element 20 are sandwiched between the inner housing 30 and the outer housing 40.

The fifth waterproof portions 221 are formed on the inner walls of the long openings 22 of the sealing element 20. As a result, the peripheries of the standing board portions 31 are waterproofed.

Moreover, the electric wire via openings 42 of the outer housing 40 are connected to the electric wire insertion openings 21 of the sealing element 20, and further connected into the interior of the inner housing 30, as illustrated in FIGS. 8 and 10. The electric wires inserted into the electric wire via openings 42 and the electric wire insertion openings 2121 are connected to terminals (not illustrated) that are included in the inner housing 30 and make electrical contact with the mating connector 2. The electric wires are disposed such that water intrusion paths along the electric wires are blocked by the first waterproof portions 211 including the recesses and projections of the inner walls of the electric wire insertion openings 21 of the sealing element 20.

Moreover, the wall 41 of the outer housing 40 comes into contact with the second waterproof portion 23 formed around the outer peripheral surface of the sealing element 20, whereby a water intrusion path along the wall surface of the outer housing 40 is blocked.

In addition, the outer wall surface of the inner housing 30 comes into contact with the periphery of the fourth waterproof portion 25 of the sealing element 20. As a result, a water intrusion path along the outer wall surface of the inner housing 30 is blocked.

When the mating connector 2 mates with the waterproof connector 1, the mating housing 2A comes into contact with the periphery of the third waterproof portion 24 of the sealing element 20. As a result, a water intrusion path along the mating housing 2A is blocked.

In accordance with the present embodiment, the cost of the waterproof connector 1 is reduced by adopting the sealing element 20 that includes the family seal portion that waterproofs the peripheries of the electric wires and the seal ring portion that performs waterproofing between the mating housing and the housing of the waterproof connector 1, and is molded as a continuous integral component, as described above.

When the electric wires are inserted into the electric wire insertion openings 21, the sealing element 20 receives force in a direction in which the electric wire insertion openings 21 are expanded by the electric wires. This means that in other words, the sealing element 20 swells in a horizontal direction, as indicated by the arrows W in FIG. 8. Both a portion which corresponds to an example of the family seal portion that waterproofs the peripheries of the electric wires, and in which the electric wire insertion openings 21 are formed, and the third waterproof portion 23 corresponding to an example of the seal ring portion that performs waterproofing between the housings are formed in the sealing element 20 of the present embodiment. Therefore, the swelling caused by inserting the electric wires into the electric wire insertion openings 21 also influences the third waterproof portion 24, the third waterproof portion 24 is pressed against the mating housing 2A in correspondence with the swelling, and the waterproof performance of such a pressed portion is improved. In the case of the present embodiment, the second waterproof portion 23 is also strongly pressed against the outer housing 40. In accordance with the waterproof connector 1 of the invention, a secondary effect which is improvement in waterproof performance is also expected in comparison with a waterproof connector adopting a family seal and a reel ring which are separate from each other, as described above.

What is claimed is:

1. A waterproof connector comprising:

a connector housing that mates with a mating housing, including a first housing and a second housing; and a sealing element that is a continuous integral component and comprises:

a family seal portion that surrounds a periphery of each of a plurality of electric wires to perform sealing the periphery of each of the electric wires, the family seal portion arranged between and engaged with the first housing and the second housing; and a seal ring portion that is positioned between the mating housing and the connector housing to perform sealing between the mating housing and the connector housing, the second housing including an inwardly facing inner wall that comes into contact with an outwardly facing outer wall surface of the sealing element.

2. The waterproof connector according to claim 1, wherein the inwardly facing inner wall of the second housing opposes the outwardly facing outer wall surface of the sealing element in a mating direction of the connector housing and the mating housing.

3. The waterproof connector according to claim 1, wherein the sealing element comprises a through-hole that penetrates the sealing element in the mating direction, and the first housing comprises a penetration catch portion that penetrates the through-hole to catch the second housing.

4. The waterproof connector according to claim 3, wherein an inner wall surface of the through-hole comprises a shape that allows sealing of a periphery of a portion, passing into the through-hole, of the penetration catch portion.

5. The waterproof connector according to claim 4, wherein the sealing element comprises a concave portion into which the first housing is fitted, and an inner wall surface, coming into contact with the first housing, of the concave portion comprises a shape that allows sealing between the first housing and the sealing element.

6. A waterproof connector comprising:

a connector housing adapted to mate with a mating housing in a mating direction; and a sealing element that is a continuous integral component, including:

a family seal portion defining a plurality of wire openings adapted to surround a periphery of each of a plurality of electric wires to perform sealing the periphery of each of the electric wires; and a seal ring portion positioned between the mating housing and the connector housing to perform sealing between the mating housing and the connector housing, the seal ring portion including:

an outer waterproof surface defining a plurality of circumferential sealing ribs facing in an outward direction normal to the mating direction; and an inner waterproof surface defining a plurality of circumferential sealing ribs facing in an inward direction normal to the mating direction and opposite the outward direction.

7. The waterproof connector according to claim 6, wherein the outer waterproof surface extends beyond the family seal portion in the mating direction or an unmating direction of the connector housing and the mating connector.

8. The waterproof connector according to claim 7, wherein the outer waterproof surface includes a first portion and a second portion offset from one another in the mating direction.

9. The waterproof connector according to claim 8, wherein the second portion of the outer waterproof surface is formed on a surface of a circumferential wall of the seal ring facing in the outward direction, and the inner waterproof surface is formed on a surface of the circumferential wall facing in the inward direction.

10. The waterproof connector according to claim 9, wherein at least one dimension of the circumferential sealing ribs of the first portion of the outer waterproof surface is distinct from a corresponding at least one dimension of the circumferential sealing ribs of the second portion of the outer waterproof surface.

11. The waterproof connector according to claim 9, wherein the first portion of the outer waterproof surface engages with an inward facing surface of the connector housing.

12. The waterproof connector according to claim 11, wherein the inner waterproof surface engages with an outward facing surface of the connector housing.

13. The waterproof connector according to claim 12, wherein the second portion of the outer waterproof surface is adapted to engage with an inward facing surface of the mating connector and engages with an outward facing surface of the connector housing.

14. The waterproof connector according to claim 13, wherein the connector housing includes a first housing and a second housing, the first housing defines the outward facing surface engaging with the inner waterproof surface.

15. The waterproof connector according to claim 14, wherein the second housing defines the inward facing surface engaging with the first portion of the outer waterproof surface.

16. The waterproof connector according to claim 15, wherein a circumferential slot adapted to receive a portion of the mating connector is defined between the first housing and the second housing.

17. The waterproof connector according to claim 16, wherein the circumferential wall of the seal ring is arranged within the circumferential slot such that the portion of the mating connector is received between the second portion of the outer waterproof surface and the second housing.

18. The waterproof connector according to claim 17, further comprising a mating connector received within the circumferential slot and having an inward facing surface engaging with the second portion of the outer waterproof surface.

* * * * *